April 28, 1959
B. N. MAAS
2,883,920
PRESSURE REGULATING MECHANISM
Filed April 11, 1952
2 Sheets-Sheet 2
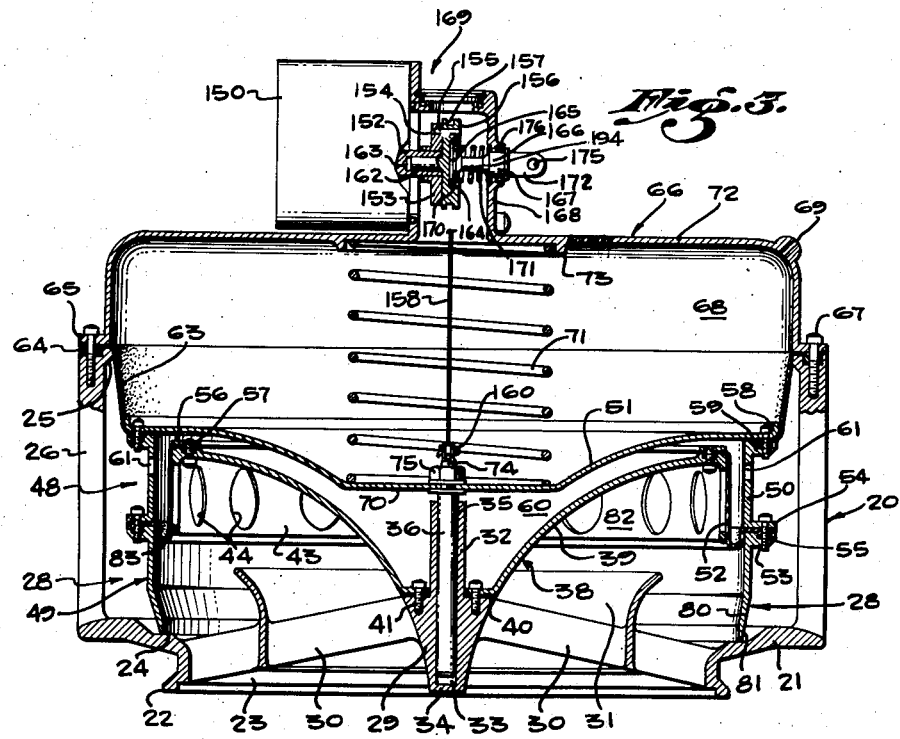
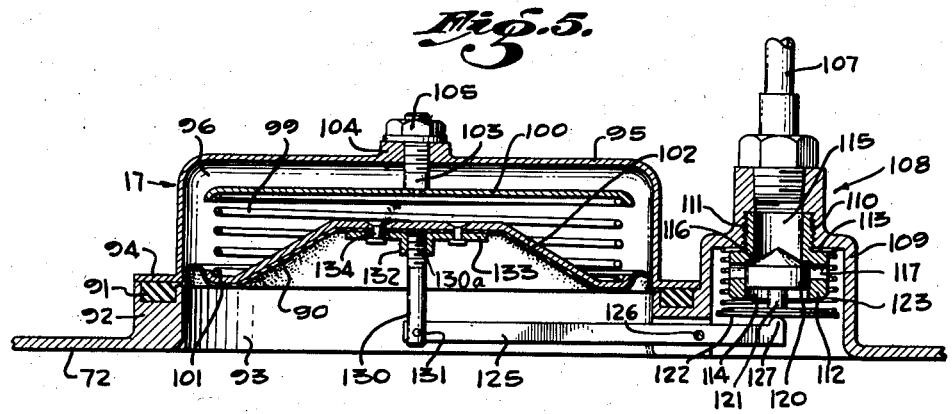
BERNARD N. MAAS,
INVENTOR.
BY
ATTORNEY United States Patent Office 2,883,920
Patented Apr. 28, 1959

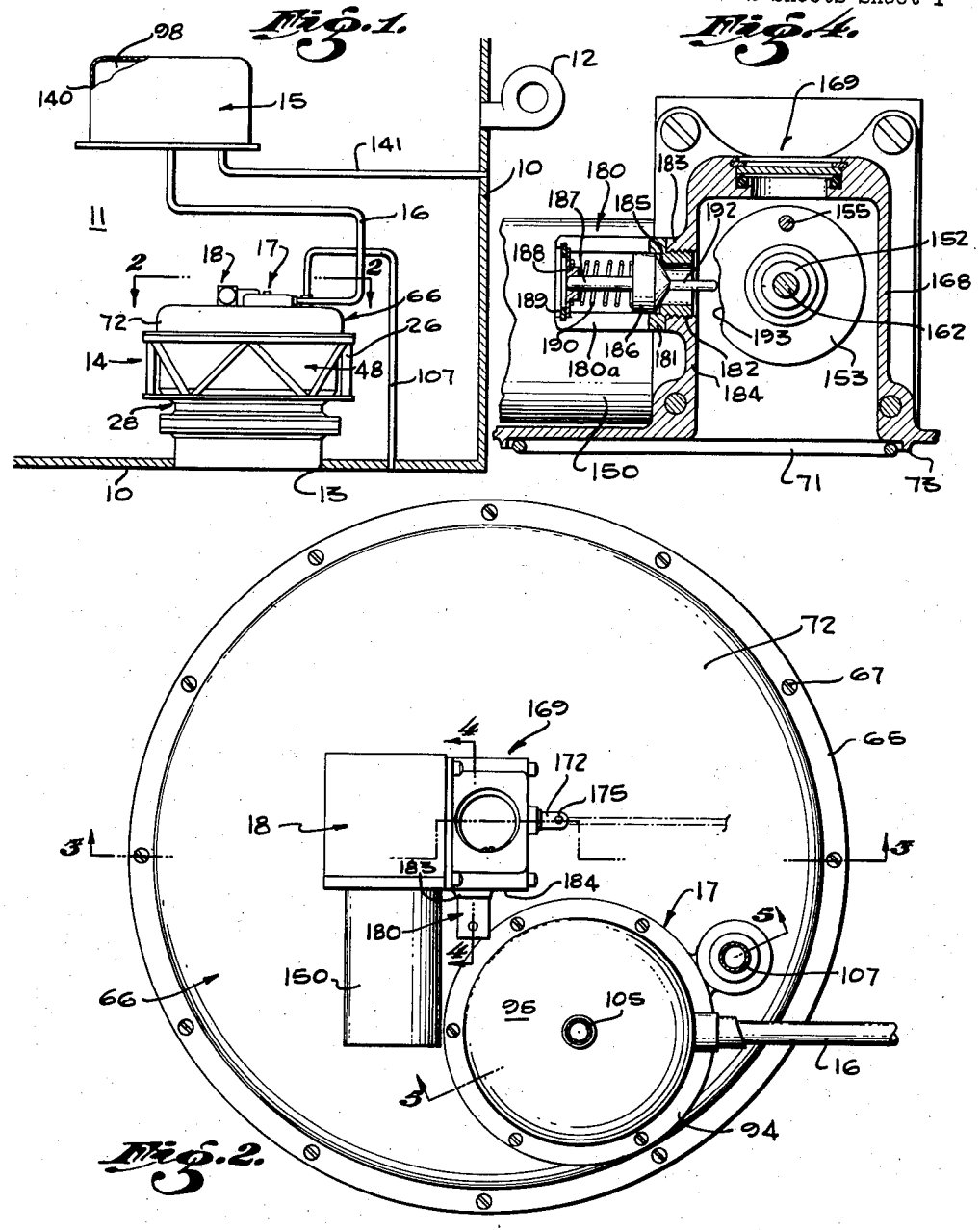

2,883,920
PRESSURE REGULATING MECHANISM

Bernard N. Maas, Pacific Palisades, Calif., assignor to The Garrett Corporation, Los Angeles, Calif., a corporation of California Application April 11, 1952, Serial No. 281,751

9 Claims. (Cl. 98—1.5)

This invention relates generally to pressure control mechanisms, and relates more particularly to improved mechanisms for controlling the pressure within an enclosure.

While the invention has particular utility in connection with the pressurization of aircraft cabins and the like, and is shown and described herein as embodied in a pressurizing system for aircraft cabins, it will be understood that its utility is not limited thereto.

It is sometimes desirable in pressurized aircraft cabins to have a relatively large outflow control valve or a plurality of said valves but the use of such large valves involves difficulties or problems, particularly in the control thereof.

For example, the air metering or pilot valves of regulator mechanisms are usually relatively small and do not have sufficient flow capacity for properly controlling large outflow valves so that such large outflow valves may either overtravel or may have an undesirable lag. Such overtravel or lag is particularly noticeable where the control mechanism is remotely positioned with respect to said outflow valves.

It is, therefore, an object of the present invention to provide pressure control mechanism which will overcome or solve the above difficulties or problems respectively.

Another object of the invention is to provide mechanism of this character which will reduce to a minimum the transitional range between the unpressurized and the isobaric range.

Still another object of the invention is to provide mechanism of this character which will permit the use of standard regulator mechanism containing relatively small metering valves to work or control outflow valves which have a large capacity.

A further object of the invention is to provide mechanism of this character wherein standard regulating mechanisms will effect rapid response of such large capacity outflow valves.

A still further object of the invention is to provide mechanism of this character whereby changes in pressure of the regulator pressure control chamber will be magnified to effect rapid changes in pressure in the head or operating pressure chamber of the outflow valve.

Another object of the invention is to provide mechanism of this character whereby rapid changes in the outflow valve operating pressure chamber will be effected in response to changes in regulator head pressure so that said outflow valve will be controlled in such a manner as to control cabin pressure and cause the latter to follow regulator control chamber pressure.

Still another object of the invention is to provide pneumatic relay means embodied in the outflow valve or valves whereby the foregoing objects will be effected.

A further object of the invention is to provide mechanism of this character including power actuated means for effecting positive opening of the outflow valve.

A still further object of the invention is to provide mechanism of this character wherein the outflow valve may be quickly released from the power actuated mechanism to permit the outflow valve to be closed.

Another object of the invention is to provide mechanism of this character having a poppet valve automatically opened by the power actuated means to relieve the operating pressure chamber of the outflow valve so as to prevent compression of the air in said operating pressure chamber and, hence, permit the required rapid opening of this valve.

Still another object of the invention is to provide mechanism of this character wherein the operating pressure chamber of the outflow valve may be connected with a suitable region of pressure so that said valve will quickly close when released from the power actuated mechanism.

A further object of the invention is to provide mechanism of this character including various novel details of construction.

A still further object of the invention is to provide apparatus of this character wherein the pressure regulating mechanism may be remotely positioned with respect to the outflow valve or valves.

Other objects and advantages of the invention will be apparent from the following part of the specification.

Referring to the drawings, which are for illustrative purposes only:

Fig. 1 is a diagrammatic or schematic view of a pressure control mechanism or system embodying the present invention and installed in an aircraft cabin;

Fig. 2 is a view of the outflow valve mechanism as seen from line 2—2 of Fig. 1;

Fig. 3 is a sectional view taken on line 3—3 of Fig. 2;

Fig. 4 is a sectional view taken on line 4—4 of Fig. 2; and

Fig. 5 is a sectional view taken on line 5—5 of Fig. 2.

Referring to the drawings, particularly Fig. 1, there is shown walls 10 defining an aircraft cabin 11 which is supplied with air under pressure by a supercharger 12 or any other suitable means. The cabin has an outlet opening 13 in one of the walls 10 which is controlled by an outflow valve, indicated generally at 14, and, in turn, controlled by a regulator unit 15 connected to said outflow valve by a conduit 16. There is a relay mechanism, indicated generally at 17, for the apparatus of system and power actuated means, indicated generally at 18 for positively opening the outflow valve as will be more particularly described hereinafter.

Referring more particularly to Fig. 3, the outflow valve comprises a valve body, indicated generally at 20, which includes a base member 21 having a flange 22 whereby the mechanism may be secured to the aircraft wall or other arrangement whereby said outflow valve may be supported so as to control the outflow opening 13 of the enclosure or aircraft cabin. The base member is provided with a valve opening 23 having a valve seat 24 thereabout. The valve body includes an annular flange 25 spaced axially from the base member and axially aligned therewith, said flange 25 being connected with the base member by a plurality of annularly spaced struts 26 between which are openings for the passage of air therethrough which may then communicate with the outlet 23 in the base member when the valve is open. The flow of air between the struts 26 is indicated by arrows 28.

Within the valve body assembly 20 is a coaxial pedestal 29 of generally frusto-conical shape which has its smaller end disposed outwardly and which is supported by the arms 30 of a spider arrangement, the outer ends of the arms 30 being formed integrally with or otherwise secured to the base member 21. The arms 30 also support a flow directing vane 31 which is smaller than the opening 23 in the base member and which flairs upwardly relative to the arms thereof, as shown in Fig. 3.

The pedestal 29 is provided with an inward extension 32 and there is an axial bore 33 through the extension 32 and pedestal 29, said bore being closed at the outer end 34. The space in the bore between the bottom thereof and the lower end of a shaft 36 (as shown in Fig. 3) is vented to prevent undesired pressure from being built up therein upon movement of said shaft which is slidably mounted in the bore 33. This venting may be effected by providing a loose fit between the shaft 36 and the walls of the bore 33 or the shaft may be provided with a longitudinally extending groove 35 which will provide the required venting. Alternatively, the groove could be formed in the wall of the bore 33 so as to connect the chamber 60 with the space at the bottom of the bore 33 which it is desired to vent.

Attached to the larger end of the pedestal 29, is a baffle, indicated generally at 38, said baffle including a generally frusto-conical portion 39 having an inwardly extending flange 40 at the smaller end, said flange having openings therein for reception of screws 41 whereby the baffle 38 is secured to the pedestal 29. The baffle also includes a generally cylindrical peripheral flange 43 which extends toward but is spaced from the base member 21, said flange being provided with a plurality of annularly spaced openings 44 therein.

About the baffle and in spaced relation thereto is a pressure sensitive control element, indicated generally at 48, which includes a movable valve member, indicated generally at 49, a generally cylindrical member 50 and a valve cover member 51. An annular diaphragm 52 connects the baffle 39 with the pressure sensitive control element 48, an outer peripheral edge portion of the diaphragm 52 being clamped between an outwardly extending flange 53 of the valve member 49 and a corresponding flange 54 at the adjacent end of the cylindrical member 50, screws 55 securing the parts together. An inner edge portion of the diaphragm 52 is clamped between the peripheral portion of the baffle 39 and an annular clamping ring 56, the parts being secured together by screws 57. The cover member or plate 51 of the pressure sensitive control element is secured to the opposite end of the cylindrical member 50 by means of screws 58 which are received in an outwardly extending annular flange 59 of the cylindrical member 50. The pedestal 29, baffle 38, diaphragm 52, cylindrical member 50 and cover plate 51 define a chamber 60 which communicates with the interior of the cabin by means of opening 61 in the cylindrical member 50.

The pressure sensitive control element 48 is connected with the valve body by means of a flexible diaphragm 63 which is annular in shape and which has an interior edge portion clamped between the peripheral edge portion of the cover plate 51 and flange 59 of the cylindrical member 50. The diaphragm 63 has an enlarged bead 64 about its peripheral edge, said bead being received in a recess provided therefor in the flange 24 of the valve body assembly. The bead and marginal edge portion of the diaphragm 63 is clamped between the flange 25 and an outwardly extending flange 65 of a valve cover member 66 by means of annularly spaced screws 67. The cover member 66 is in the shape of an inverted shallow cup and defines, with the diaphragm 63 and cover plate 51, a chamber 68 for a valve operating pressure, said chamber 68 having a bleed connection 69 with a source of higher pressure such as the cabin.

The cover plate 51 is generally frusto-conical in shape in the central region and is inclined toward the baffle plate 39 in axial spaced relation thereto. The plate 51 includes a central portion 70 which is normal to the axis of the mechanism and against which one end of a light spring 71 reacts, the opposite end of said spring reacting against the outer wall 72 of the cover member 66, there being a raised annular flange 73 within the cover 66 and integral with the wall 72 to provide spring retaining means for said spring 71. The shaft 36, which is slidable in the bore 33, and which is guided therein has a reduced upper end portion 74 which is threaded for reception of a nut 75, said end portion 74 being received in an opening provided therefor in the portion 70 of the plate 51 and said nut securing the plate and shaft 36 together. Thus the movements of the pressure sensitive control element 48 are guided so that said element is maintained in axial alignment in the mechanism.

The valve member 49 includes an inwardly inclined portion 80 which terminates in a relatively sharp edge 81 engageable with the valve seat 24. The pressure sensitive control element 48 is balanced with respect to atmospheric pressure which prevails within the pocket 82 defined by the pedestal 29, baffle 38, diaphragm 52 and valve member 49. This is due to the fact that the portion 80 has an effective area subjected to said atmospheric pressure which is substantially equal to and opposed to a corresponding area of the convolution 83 of the diaphragm 52. Inasmuch as the chamber 60 is connected with the cabin by means of opening 61 in cylindrical member 50, one side of the plate 51 of the pressure sensitive element 48 is subjected to enclosure or cabin pressure. Likewise, the outer side of the diaphragm 63 is exposed to cabin pressure and said diaphragm 63 may be considered as part of the pressure sensitive control element. The opposite sides of said diaphragm 63 and plate 51 are exposed to the operating pressure within the chamber 68, said operating pressure urging the pressure sensitive control element in the valve closing direction, aided by the force of the spring 71.

Means for controlling the pressure in the chamber 68 includes the pneumatic relay 17 which controls the outflow of air from said chamber 68 and the regulator 15 which controls the operation of the relay.

Referring more particularly to Fig. 5, there is diagrammatically shown the pneumatic relay. This relay includes a diaphragm 90 which has a marginal bead 91. The bead is received in a recess provided in an outwardly extending flange 92 shown as formed integrally with the wall 72 of the cover member 66, said flange defining an opening 93 in said wall 72. The peripheral margin portion of the diaphragm 90 is secured between the outer end of said flange 92 and an outwardly extending flange 94 of a cap 95 formed in the shape of a shallow cup and defining, with said diaphragm 90, a relay pressure chamber 96 which is connected to the control pressure chamber 98 of the regulator mechanism 15 by means of the conduit 16.

One side of the diaphragm 90 is subjected to the pressure in the chamber 68 and the opposite side is subjected to the pressure in chamber 96, the diaphragm 90 being urged outwardly of the chamber 96 by a spring 99 which reacts between a spring retainer 100, within the chamber 96, and a spring retaining portion 101 of a plate 102 on the side of the diaphragm 90 facing the chamber 96. The plate 102 may be of any suitable shape but is shown as frusto-conical in its central region. The spring retainer 100 is attached to an adjusting screw 103 which is threaded through an opening provided in a boss 104 extending outwardly of the cap 95 and locked in adjusted position by a nut 105. Chamber 68 of the outflow valve has a connection with a region of lower pressure such as ambient atmosphere, for example, and this connection includes the conduit or duct 107 which is connected to a valve, indicated generally at 108, and which controls the flow of fluid from the chamber 68 to said region of lower pressure. The valve 108 is disposed within a housing 109 which has an internally threaded portion 110 for threaded reception of an external extension 111 of a valve cage 112 having a shoulder 113 which abuts against the outer end wall of the housing 109. Valve cage 112 has a bore 114 connected with a reduced diameter bore 115, there being a valve seat 116 at the junction of said bores 114 and 115. A plurality of laterally extending openings 117 are provided in the valve cage for the passage of air into bore 114 adjacent the seat 116. Within the bore 114 is slidably received a movable valve member 120 which has a conical tip engageable with the seat 116 for controlling the flow of air through said valve 108. Extending axially from the valve member 120, from the end of said valve member opposite the conical tip, is a stem 121 having an enlarged disc 122 secured thereto by any suitable means such as riveting or the like, not shown. The disc 122 is of larger diameter than the cage 112 and a spring 123 reacts between said disc 122 and the closed end wall of the housing 109, spring 123 being disposed about the cage and in the space between said cage and the housing 109.

Means for connecting the valve member 120 with the pressure responsive mechanism of the relay includes a lever 125 pivoted at 126 intermediate the ends thereof. Pivot 126 is closer to the valve actuating end of lever 125, the latter having a rounded end portion 127 for engagement with the disc 122, said spring 123 urging the valve member 120 into engagement with said end portion 127. The opposite end of lever 125 is connected to a rod 130 adjacent the lower end thereof, as shown in Fig. 5. The connection between lever 125 and rod 130 comprises a pivot 131 and the opposite end of said rod is externally threaded at 130a and said threaded end is received in an internally threaded recess provided therefor in a boss 132 extending outwardly of a plate 133 on the side of the diaphragm 90 opposite the plate 102. Rivets 134 or the like secure plate 133 to plate 102 and clamps therebetween a central area of the diaphragm.

Variations in the differential of pressure between that in the chamber 68 and chamber 96 will effect movement of the diaphragm 90 and such movements will, in turn, position the valve member 120 so as to control the escape of air from chamber 68 to ambient atmosphere. Thus the pressure in chamber 68 is controlled and this, in turn, controls the positioning of the outflow valve member 49 so as to control the pressure in the cabin.

The pressure in chamber 98 of the regulator mechanism 15 is controlled by suitable pressure responsive means for controlling said chamber pressure in accordance with a pre-selected schedule.

One type of mechanism for controlling the pressure in chamber 98 is disclosed in applicant's copending application for Pressure Regulating Mechanism, Serial No. 258,146, filed November 26, 1951. One or more of the various units disclosed therein for controlling the pressure within the control chamber thereof may be used for controlling the pressure in chamber 98. It is to be understood, of course, that various other means may be used for controlling the pressure in chamber 98, the above mentioned application being used by way of example. It is to be noted that the control pressure chamber 98 has an inlet bleed 140 from a region of higher pressure, such as the cabin, and a connection 141 with a region of lower pressure, such as ambient atmosphere. The outlet connection 141 is controlled by the pressure control means which controls the pressure in chamber 98.

Means for positively opening the outflow valve 20 comprises the actuator 18 which includes a motor 150 connected with and adapted to drive the shaft 152, Fig. 3, to which a clutch plate 153 is secured by welding or other suitable means. The clutch plate 153 is provided with an opening 154, spaced from the axis of said plate, for reception of a pin 155 secured to a clutch plate 156 having a peripheral groove 157 so that said plate 156 also functions as a pulley on which may be wound a cable 158 when the actuator motor 150 is energized. The opposite end of the cable 158 is secured to the shaft 36 by any suitable means such as a cotter pin 160 or the like and there is sufficient slack in the cable to permit full closing of the outflow valve under normal conditions of outflow valve operation. The clutch plate 156 has an axial shaft 162 slidably and rotatably received in an axial opening 163 in the shaft 152 which extends through the plate 153. The opposite side of the plate 156 has a recess 164 for reception of an enlarged portion 165 of a shaft 166 which has a portion 167 journaled in a wall 168 of a clutch housing, indicated generally at 169, said clutch housing being shown as formed integrally with the cover 66. The portion 165 of shaft 166 is retained in the recess 164 by a snap ring 170 so that the disc or plate 156 may rotate on said shaft 166. Shaft 166 also includes a relieved portion 171 between the wall 168 and the portion 165 and also has a clevis 172 which projects outwardly of the wall 168 which is provided with an opening 175 for a pin or the like to which an actuating member, not shown, may be secured. "O" ring 176 normally seals the portion 167 of the shaft 166 with respect to the bearing in which said shaft is mounted.

Means is also provided for quickly receiving the chamber 68 of a pressure build-up when the outflow valve is opened by the actuating mechanism. This means is shown as comprising a relief valve, indicated generally at 180, which includes a valve cage 181 with an externally threaded projection 182 at one end threaded into a boss 183 in end wall 184 of the housing 169. The valve 180 includes a valve seat 185 with which a movable valve member 186 is adapted to cooperate. Normally, valve member 186 is seated. This valve member is provided with an outwardly extending stem 187, slidably received in an opening provided therefor in an end member 188 secured to the valve cage by snap ring 189 received in a groove provided therefor in the outer end of the cage. Spring 190 reacts between the member 188 and the valve member 186 urging the latter toward the seat 185. The movable valve member is also provided with an inwardly extending stem 192 which operably engages the cam surface 193 of the clutch plate 153, rotation of the clutch plate causing the cam to move the valve member 186 to an open position so as to relieve the pressure in the chamber 68 by permitting air to flow from said chamber into the cabin, air being adapted to pass between the arms 180a of the valve cage as it flows past the valve seat 185 and valve member 186.

Outflow valve member 49 may be positively moved from its seat by means of the actuator 18 when the actuator motor 150 actuates the clutch.

As the actuator motor starts to operate and rotate the clutch plate 156, the slack present in the cable 158 under normal conditions is first taken up and then the valve member 49 is positively moved from its seat. Simultaneously, with the rotation of the clutch plates, the cam surface 193 moves from the normal position shown in Fig. 4 so that the movable valve member 186 is moved from its seat thereby preventing any build-up of pressure in the chamber 68 which would interfere with the opening movement of the valve member 49 by the actuator.

Should it be desired to suddenly close the outflow valve 49 when the latter is in an open position, the clutch member 156 may be disengaged from the member or plate 153 by moving the shaft 166 outwardly a sufficient distance to pull the pin 155 from the opening 154. This movement of the clutch member or disc 156 is effected against the force of spring 194 and it is to be noted that the axial movement of plate 156 is insufficient to pull the shaft 162 from the bore 163. As the shaft 166 is pulled outwardly, the relieved portion 171 enters the bearing opening normally occupied by the part 167 to thereby connect the chamber 68 with the enclosure or cabin. Under this condition, the pressure sensitive control element is subjected on both sides to cabin pressure and the spring 71 may easily and quickly effect seating of the valve member 49.

Under some conditions, as when the actuator mechanism has substantially fully opened the outflow valve, the relief valve 180 may be opened at the time it is desired to effect sudden and rapid closing of said outflow valve. This valve 180 then merely provides additional communication between the chamber 68 and the cabin, but in any event, when the clutch plate 156 is disengaged from the plate 153, the chamber 68 is connected with the cabin by way of the relieved portion 171 of shaft 166.

As above pointed out, the cable 158 normally may have a certain amount of slack in it. At least this cable should be loose enough to permit complete seating of the valve member 49 under normal conditions and, due to the flexibility of the cable 158, normal operative movements of the pressure sensitive control element may occur without interference from said cable.

I claim:

1. In pressure control mechanism for controlling the pressure in an enclosure: outflow valve means for controlling the outflow of air from said enclosure, said outflow valve means including a pressure sensitive control element and valve element controlled thereby, one side of said pressure sensitive control element being subjected to enclosure pressure; walls defining a chamber for an operating pressure, said chamber having an inlet connection and an outlet connection and the other side of said pressure sensitive element being subjected to the pressure in said chamber; relay means including a relay valve controlling the outlet connection and a pressure responsive wall controlling said relay valve, said wall being subjected on one side to the pressure in said chamber; means for subjecting the opposite side of said wall to a control pressure; yielding means urging the outflow valve member in the closing direction; power actuator means; a clutch having a driving member connected to the actuator means and operated thereby, and a driven member, said driven member having a peripheral groove and the driving member having a peripheral cam surface; disengageable means providing a positive connection between said clutch members; a flexible cable having one end connected to the driven member and adapted to be wound thereon in the groove thereof, the other end of said cable being connected to the valve member of the outflow valve and having sufficient slack therein to permit full closing of said valve under normal conditions; a relief valve for the operating pressure chamber, said valve being controlled by the cam portion of the driving clutch member and being moved to an open position when the actuator mechanism is operating to effect positive opening of the outflow valve; and means for disconnecting the driven member of the clutch from the driving member thereof.

2. In pressure control mechanism for controlling the pressure in an enclosure: outflow valve means including a pressure sensitive control element and valve element controlled thereby, one side of said pressure sensitive control element being subjected to enclosure pressure; walls defining a chamber for an operating pressure, the other side of said pressure sensitive control element being subjected to said operating pressure; relay means for controlling the pressure in said chamber by controlling the flow of fluid relative thereto, said relay means having a pressure responsive control member, one side of said control member being subjected to said operating pressure and the opposite side of said control member being adapted to be subjected to a control pressure; yielding means urging the outflow valve member in the closing direction; a power actuator; a clutch operably connected to said actuator, said clutch including means for effecting a positive drive therethrough and having a disconnectible part connected to the outflow valve member for effecting opening movement thereof upon actuation of the actuator in one direction; and means for disconnecting said part from the actuator and simultaneously venting the operating pressure chamber to the enclosure so that said outflow valve member will quickly close when said clutch part is disconnected.

3. In pressure control mechanism for controlling the pressure in an enclosure: outflow valve means including a pressure sensitive control element and valve element controlled thereby, one side of said pressure sensitive control element being subjected to enclosure pressure; walls defining a chamber for an operating pressure, the other side of said pressure sensitive control element being subjected to said operating pressure; relay means for controlling the pressure in said chamber by controlling the flow of fluid relative thereto, said relay means having a pressure responsive control member, one side of said control member being subjected to said operating pressure and the opposite side of said control member being adapted to be subjected to a control pressure; yielding means urging the outflow valve member in the closing direction; a power actuator; a clutch operably connected to said actuator, said clutch including means for effecting a positive drive therethrough and having a disconnectible part connected to the outflow valve member for effecting opening movement thereof upon actuation of the actuator in one direction; and means for venting the operating pressure chamber to the enclosure.

4. In pressure control mechanism for controlling the pressure in an enclosure: outflow valve means including a pressure sensitive control element and valve element controlled thereby, one side of said pressure sensitive control element being subjected to enclosure pressure; walls defining a chamber for an operating pressure, the other side of said pressure sensitive control element being subjected to said operating pressure; yielding means urging the outflow valve member in the closing direction; a power actuator; a clutch operably connected to said actuator, said clutch including means for effecting a positive drive therethrough and having a disconnectible part connected to the outflow valve member for effecting opening movement thereof upon actuation of the actuator in one direction; and means for venting the operating pressure chamber to the enclosure.

5. In pressure control mechanism for controlling the pressure in an enclosure: outflow valve means including a pressure sensitive control element and a valve element controlled thereby, one side of said pressure sensitive element being subjected to enclosure pressure; walls defining a chamber for an operating pressure, the other side of said pressure sensitive control element being subjected to the pressure in said chamber; yielding means urging the outflow valve element in the closing direction; power actuator means; a clutch having one part connected to the actuator means and another positively driven part adapted to be disconnected from said one part; said one part having a cam portion; means connecting the second mentioned part and the outflow valve member; and a relief valve adapted to be operated by the cam portion of said one clutch member.

6. In pressure control mechanism for controlling the pressure in an enclosure: outflow valve means including a pressure sensitive control element and a valve element controlled thereby, one side of said pressure sensitive element being subjected to enclosure pressure; walls defining a chamber for an operating pressure, the other side of said pressure sensitive control element being subjected to the pressure in said chamber; yielding means urging the outflow valve element in the closing direction; power actuating means; clutch means including a part connected to the actuator means and a second part driven by said first part but disengageable therefrom; means connecting the valve element with the second clutch part; and a pressure relief valve for said chamber, said pressure relief valve being controlled by said clutch means.

7. In pressure control mechanism for controlling the pressure in an enclosure: outflow valve means including a pressure sensitive control element and a valve element controlled thereby, one side of said pressure sensitive element being subjected to enclosure pressure; walls defining a chamber for an operating pressure, the other side of said pressure sensitive control element being subjected to the pressure in said chamber; yielding means urging the outflow valve element in the closing direction; power actuator means; pressure relief means for said chamber; means operated by the actuator means for controlling said relief means; and releasable means connecting the actuator means with said valve element.

8. In pressure control mechanism for controlling the pressure in an enclosure: outflow valve means including a pressure sensitive control element and valve element controlled thereby, one side of said pressure sensitive control element being subjected to enclosure pressure; walls defining a chamber for an operating pressure; the other side of said pressure sensitive control element being subjected to said operating pressure; yielding means urging the outflow valve member in the closing direction; a power actuator; a clutch operably connected to said actuator, said clutch including means for effecting a positive drive therethrough and having a disconnectible part connected to the outflow valve member for effecting opening movement thereof upon actuation of the actuator in one direction; means, operated by said clutch, for connecting the operating pressure chamber to the enclosure; and means for disconnecting said clutch part and simultaneously connecting said operating pressure chamber with the enclosure.

9. In pressure control mechanism for controlling the pressure in an enclosure: outflow valve means including a pressure sensitive control element and a valve element controlled thereby, one side of said pressure sensitive element being subjected to enclosure pressure; walls defining a chamber for an operating pressure, the other side of said pressure sensitive control element being subjected to the pressure in said chamber; yielding means urging the outflow valve element in the closing direction; power actuator means; a clutch having one part connected to the actuator means and another positively driven part adapted to be disconnected from said one part; said one part having a cam portion; means connecting the second mentioned part and the outflow valve member; a relief valve adapted to be operated by the cam portion of said one clutch member; and means for disconnecting said clutch part and simultaneously connecting the operating pressure chamber with the enclosure.

References Cited in the file of this patent
UNITED STATES PATENTS

| | | |
|---|---|---|
| 2,407,540 | Del Mar | Sept. 10, 1946 |
| 2,463,490 | Kemper | Mar. 1, 1949 |
| 2,498,633 | Arthur | Feb. 28, 1950 |
| 2,513,332 | Kemper | July 4, 1950 |
| 2,578,773 | Arthur | Dec. 18, 1951 |
| 2,621,577 | Cooper et al. | Dec. 16, 1952 |
| 2,672,086 | Jensen | Mar. 16, 1954 |